United States Patent
Watanabe (10) Patent No.: US 12,175,192 B2
(45) Date of Patent: Dec. 24, 2024

(54) SYSTEMS AND METHODS FOR DYNAMIC PORTALS

(71) Applicant: Legal Access Artificial Intelligence LLC, Indianapolis, IN (US)

(72) Inventor: Scott M. Watanabe, Indianapolis, IN (US)

(73) Assignee: LEGAL ACCESS ARTIFICIAL INTELLIGENCE LLC, Indianapolis, IN (US)

( * ) Notice: Subject to any disclaimer, the term of this patent is extended or adjusted under 35 U.S.C. 154(b) by 320 days.

(21) Appl. No.: 17/400,590

(22) Filed: Aug. 12, 2021

(65) Prior Publication Data

US 2022/0050965 A1 Feb. 17, 2022

Related U.S. Application Data

(60) Provisional application No. 63/065,822, filed on Aug. 14, 2020.

(51) Int. Cl.
| | |
|---|---|
| *G06F 40/30* | (2020.01) |
| *G06F 16/335* | (2019.01) |
| *G06F 40/205* | (2020.01) |
| *G06F 40/284* | (2020.01) |
| *G06F 40/289* | (2020.01) |
| *G06N 20/00* | (2019.01) |
| *G06F 16/33* | (2019.01) |

(52) U.S. Cl.
CPC .......... *G06F 40/289* (2020.01); *G06F 16/335* (2019.01); *G06F 40/205* (2020.01); *G06F 40/284* (2020.01); *G06F 40/30* (2020.01); *G06N 20/00* (2019.01); *G06F 16/3344* (2019.01)

(58) Field of Classification Search
CPC .. G06F 40/289; G06F 16/3344; G06F 16/335; G06F 40/284; G06F 40/205; G06F 40/30
USPC .......................................................... 704/9
See application file for complete search history.

(56) References Cited

U.S. PATENT DOCUMENTS

| | | | |
|---|---|---|---|
| 2009/0019375 A1* | 1/2009 | Garofalo | G06Q 10/06398 715/753 |
| 2017/0004129 A1* | 1/2017 | Shalaby | G06F 40/242 |
| 2021/0165959 A1* | 6/2021 | McNeil | G06F 40/30 |

OTHER PUBLICATIONS

Joms Antony—2013, (J. Antony, B. Vijayan, S. Joy and G. S. Santhosh Kumar, "A context aware system for generation and propagation of automated alerts from an intensive care unit," 2013 IEEE Conference on Information & Communication Technologies, Thuckalay, India, 2013, pp. 514-519, doi: 10.1109/CICT. (Year: 2013).*

* cited by examiner

*Primary Examiner* — Bharatkumar S Shah
(74) *Attorney, Agent, or Firm* — Faegre Drinker Biddle & Reath LLP (57) ABSTRACT

At least some aspects of the present disclosure direct to systems and methods of dynamic portals implemented on a computer system having one or more processors and memories. The methods includes the steps of: presenting a user portal comprising an interactive region and an informational region; receiving an intake request submitted by a user via the interactive region, the intake request being a text stream; analyzing the intake request to identify an issue associated with the intake request; determining at least one rule of a plurality of rules relevant to the issue; selecting one or more pieces of educational information from a rule repository based on the at least one relevant rule; and updating the user portal.

28 Claims, 5 Drawing Sheets

SYSTEMS AND METHODS FOR DYNAMIC PORTALS

TECHNICAL FIELD

The present disclosure relates to systems and methods for dynamic portals.

BACKGROUND

Some government and industry organizations provide portals to allow user access and submit requests. For example, pro se litigants can enter complaints and pleadings using court systems. As another example, users can submit technical support requests via company support portals. Many of these portal systems are limited to request gathering.

SUMMARY

As recited in examples, Example 1 is a method implemented on a computer system having one or more processors and memories. The method includes the steps of: presenting a user portal comprising an interactive region and an informational region; receiving an intake request submitted by a user via the interactive region, the intake request being a text stream; analyzing the intake request to identify an issue associated with the intake request, wherein analyzing the intake request to identify an issue associated with the intake request comprises: parsing the intake request using a natural language model into a plurality of intake terms; determining a plurality of contexts of the plurality of intake terms using the natural language model; classifying the plurality of intake terms by applying a trained machine learning model to the plurality of intake terms and the plurality of contexts to generate at least one classifying result; and identifying the issue based on the classifying result; determining at least one rule of a plurality of rules relevant to the issue; determining one or more parameters based on the intake request and the at least one relevant rule, the one or more parameters associated with at least one of missing information and inconsistent information; composing one or more queries based on the one or more parameters, the at least one relevant rule, and the intake request; selecting one or more pieces of educational information from a rule repository based on the at least one relevant rule; and updating the user portal by: presenting the one or more queries in the interactive region; and presenting the one or more pieces of educational information in the information region.

Example 2 is the method of Example 1, wherein using the natural language model comprises: parsing the intake request into n-grams; and generating the plurality of intake terms based on the n-grams.

Example 3 is the method of Example 1 or 2, wherein the plurality of contexts are extracted from the intake request.

Example 4 is the method of any one of Examples 1-3, wherein at least a part of the plurality of contexts are exacted from a user profile of the user.

Example 5 is the method of Example 3, wherein the user profile comprises at least one of age information, gender information, a learning style, a reading comprehension level, and social economic information.

Example 6 is the method of any one of Examples 1-5, wherein the intake request comprises a description of a request in one or more sentences.

Example 7 is the method of any one of Examples 1-6, further comprising: presenting a selectable menu in the interactive region, wherein the selectable menu comprises a list of categories of issues; and receiving a selection by the user.

Example 8 is the method of any one of Examples 1-7, wherein the trained machine learning model is trained by historical case information collected over time, wherein each historical case information comprises an intake request, an identified issue, one or more intake terms, one or more relevant rules, one or more parameters, one or more queriers, one or more pieces of educational information, or any combination thereof.

Example 9 is the method of any one of Examples 1-8, further comprising: interfacing with an electronic filing system via a software interface.

Example 10 is the method of Example 9, wherein the software interface comprises at least one of an application programming interface and a web service interface.

Example 11 is the method of any one of Examples 1-10, further comprising: determining one or more rule parameters for each rule of the plurality of rules, wherein the one or more rule parameters comprise at least one of a timing parameter, a party parameter, a location parameter, and a quantitative parameter.

Example 12 is the method of Example 11, wherein determining one or more parameters comprises: retrieving the one or more rule parameters of the at least one relevant rules; analyzing the plurality of intake terms by normalizing the plurality of intake terms and comparing the one or more rule parameters with the plurality of intake terms to generate a first analysis result; determining the at least one of missing information and inconsistent information based on the first analysis result; and determining the one or more parameters associated with the at least one of missing information and inconsistent information.

Example 13 is the method of Example 12, wherein composing one or more queries comprises: selecting one or more templates based on the at least one relevant rule; and composing the one or more queries based on the one or more parameters and the one or more templates.

Example 14 is the method of Example 12, further comprising: receiving a query input in response to the one or more queries from the user; and analyzing the intake request using the one or more rule parameters to generate a second analysis result, the second analysis result indicating whether the intake request is complete, the intake request comprising the query input.

Example 15 is the method of Example 14, further comprising: in response to the intake request being not complete; composing a text document based on at least one of the intake request, the query input, and the at least one relevant rule using a natural language generation model.

Example 16 is the method of Example 15, further comprising: submitting the text document to an electronic filing system via a software interface.

Example 17 is the method of Example 14, further comprising: in response to intake request being complete, providing a contact information of a consultant related to the identified issue.

Example 18 is the method of Example 17, further comprising: receiving a confirmation code from the consultant, the confirmation code indicating a completion of a consultant section; presenting the one or more queries in the interactive region; receiving a second query input from the user; and composing a text document based on at least one of the intake request, the second query input, and the at least one relevant rule using the natural language generation model.

Example 19 is the method of Example 18, further comprising: submitting the text document to an electronic filing system via a software interface.

Example 20 is the method of any one of Examples 1-19, further comprising: generating a schedule based on the at least one relevant rule and the intake request.

Example 21 is the method of Example 20, further comprising: transmitting the schedule to the user.

Example 22 is the method of any one of Examples 1-21, further comprising: generating one or more alerts based on the at least one relevant rule and the intake request, the one or more alerts associated with an alert timeline.

Example 23 is the method of Example 22, further comprising: transmitting the one or more alerts to the user according to the alert timeline.

Example 24 is the method of any one of Examples 1-23, wherein selecting one or more pieces of educational information comprises: receiving a plurality of pieces of educational information of the at least one relevant rule, each of the plurality of pieces of educational information associated with a difficulty level; and selecting a first piece of educational information from the plurality of pieces of educational information.

Example 25 is the method of Example 24, wherein the first piece of educational information is selected based on a user profile.

Example 26 is the method of Example 24, wherein the first piece of educational information is selected using the trained machine learning model based on historical case information.

Example 27 is the method of Example 24, further comprising: receiving a query input from the user; determining whether the intake request is complete, the intake request comprising the query input; in response to the intake request being not complete, selecting a second piece of educational information from the plurality of pieces of educational information, the second piece of educational information different from the first piece of educational information.

Example 28 is the method of Example 27, wherein the first piece of educational information is associated with a first difficulty level, wherein the second piece of educational information is associated with a second difficulty level, and wherein the second difficulty level is different from the first difficulty level.

Example 29 is the method of Example 26, wherein the second difficulty level is a level indicative of less difficult than the first difficulty level.

BRIEF DESCRIPTION OF DRAWINGS

The accompanying drawings are incorporated in and constitute a part of this specification and, together with the description, explain the advantages and principles of the invention. In the drawings.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

The conventional request intake systems are often not user friendly. For example, these system do not identify and alert users of any missing information and/or inconsistent information being submitted by the users. Additionally, these system often focus on intaking information but do not provide educational and guidance information to facilitate request submissions. At least some embodiments of the present disclosure are directed to dynamic portal systems and methods that identify and alert users of missing and/or inconsistent information when the user is submitting a request. At least some embodiments of the present disclosure are directed to dynamic portal systems and methods that dynamically present relevant educational information when the user is submitting a request. Further, at least some embodiments of the present disclosure are directed to dynamic portal systems and methods that interactively evaluate the completeness of requests and provide corresponding and relevant educational information. Additionally, at least some embodiments of the present disclosure are directed to dynamic portal systems and methods that directly interface with other systems and submit text documents generated based on the requests, to other systems.

Figure 1:
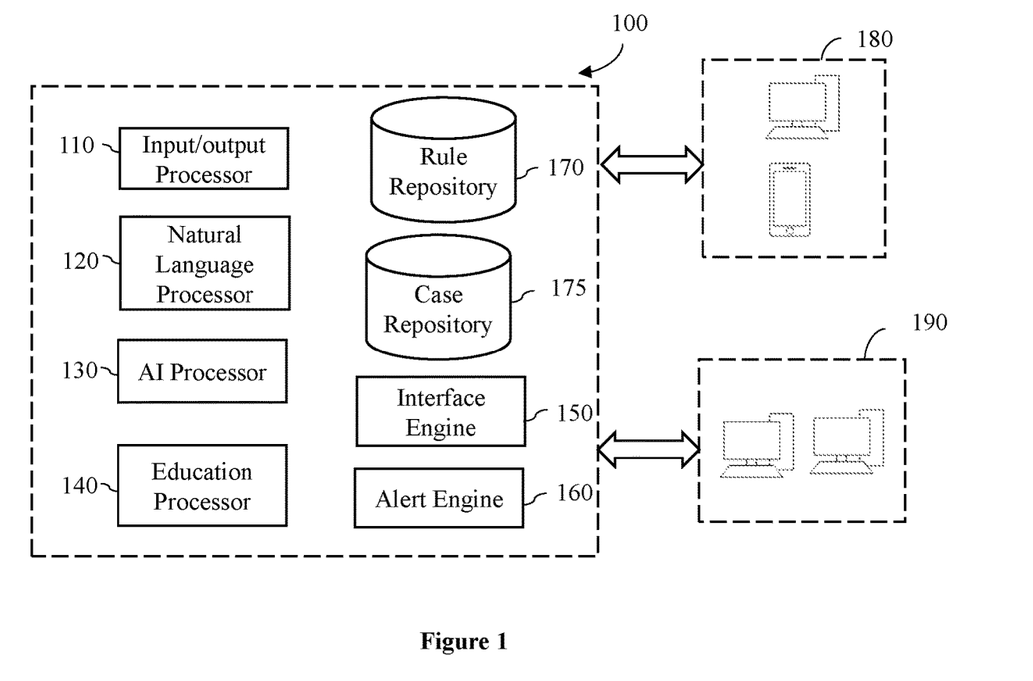
FIG. 1 depicts an illustrative system diagram of a dynamic portal system.
Figure 3A:
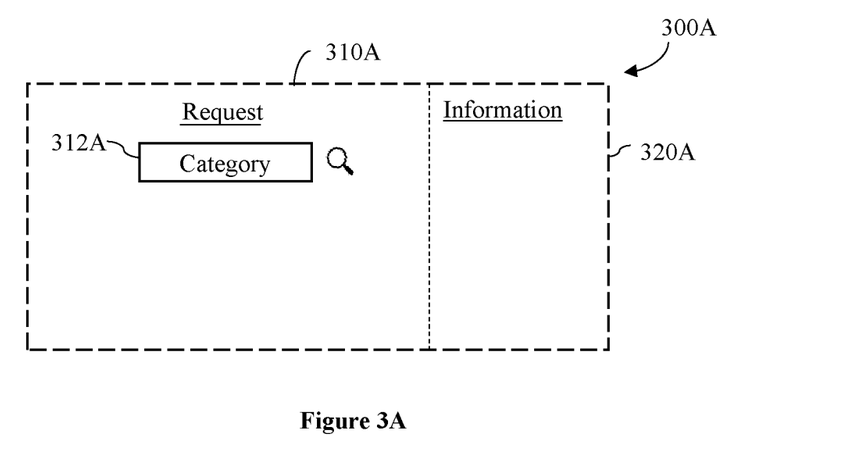
FIG. 3A is an illustrative example of a graphical representation of a dynamic portal.

FIG. 1 depicts an illustrative system diagram of a dynamic portal system 100. In this example, the system 100 includes an input/output processor 110, a natural language processor 120, an AI (Artificial Intelligent) processor 130, an education processor 140, an interface engine 150, an alert engine 160, a rule repository 170 and a case repository 175. One or more components of the system 100 are optional. In some cases, the system 100 interfaces with a client application running on one or more computing devices 180 of a user. In some cases, the system 100 interfaces with one or more other systems 190, for example, a filing system, a court system, a docketing system, a vendor system, a healthcare system, a technical support system, and/or the like. In some embodiments, the input/output processor 140 is configured to generate a graphical representation of a user portal including an interactive region and an information region. One illustrative example of the graphical user interface is depicted in FIG. 3A. In some cases, the graphical user interface is received by a client application and rendered on the computing device 180 of a user. In some cases, the input/output processor 140 is configured to receive requests submitted by users via the user portal, for example, via the interactive region of the user portal. In some cases, the request received is a text stream including a sequence of text. Additionally, the input/output processor 110 can be configured to present outputs to the users via the dynamic portal. In some cases, the input/output processor 110 receives a type of a computing device (e.g., laptop, smart phone, tablet computer, etc.) of the user and is configured to generate a graphical presentation adapted to the computing device type.

In some embodiments, the natural language processor 120 includes both natural language processing and natural language generation functionalities. In some cases, the natural language processor 120 parses the request received by the input/output processor 110 into n-grams and generate a plurality of intake terms based on the n-grams. As used herein, n-gram refers to a contiguous sequence of n words including numbers and symbols from a data stream, which typically is a phrase or a sequence of words with meaning. N-gram can include numbers and symbols, such as a comma, a period, a dollar sign, and/or the like. In some cases, the natural language processor 120 normalizes the parsed n-grams. Further, in some cases, the natural language processor 120 generates a plurality of intake terms based on the n-grams. In one example, the plurality of intake terms include normalized n-grams. As one example, the n-grams is a date and the intake term is the date in a predefined format (e.g., year-month-date). In some cases, the natural language processor 120 determines contexts of the intake terms. In one example, the contexts are a part of a same sentence of the intake term(s). In one example, the context is extracted from a user profile of the user, for example, age information, gender information, location information, a learning style, a reading comprehension level, social economic status information, and/or the like. In one example, the natural language processor 120 parses the n-grams and labels the n-grams based on the contexts, for example, name, date, age, address, request category, etc. In some embodiments, a natural language processor 120 uses a natural language model for processing the request and n-grams, for example, a statistical language model, a neural network language model, and/or the like.

In some embodiments, the AI processor 130 is configured to classify the plurality of intake terms by applying a trained machine learning model to the plurality of intake terms and/or the plurality of contexts to generate at least one classifying result. In some cases, the trained machine learning model includes at least one of a decision tree, random forest, support vector machine, convolutional neural network, recurrent neural network, and/or the like.

In some embodiments, the AI processor 130 is configured to identify an issue based on the classifying result. In one example, the identified issue is a legal issue. In another example, the identified issue is a healthcare issue. In yet another example, the identified issue is a technical support issue. In some cases, the identified issue includes information on one or more aspects, such as age, income level, trademark information, and/or the like. In some embodiments, in response to the issue being identified, the AI processor 130 is configured to determine at least one rule of a plurality of rules relevant to the issue. In some cases, the plurality of rules are stored in the rule repository 170. In some cases, at least a part of the plurality of rules are retrieved from another system. In some cases, a rule refers to a legal rule. As used herein, a legal rule refers to one of regulations, laws, statutes, and/or the like. In some cases, a rule refers to a healthcare rule, for example, one of treatment protocols, diagnosis protocols, a set of FDA (Food and Drug Administration) regulations, and/or the like.

In some embodiments, the AI processor 130 is further configured to determine one or more rule parameters related to the at least one relevant rule. In embodiments, the rule parameters comprise at least one of a timing parameter, a party parameter, a location parameter, and one or more quantitative parameter. In some cases, the AI processor 130 is configured to retrieve the one or more rule parameters of the at least one relevant rules, for example, from the rule repository 170. The AI processor 130 may be configured to compare the one or more rule parameters with the plurality of intake terms to generate an analysis result. The AI processor 130 is further configured to determine missing information and/or inconsistent information based on the analysis result. The system can determine one or more parameters associated with the identified missing information and/or inconsistent information. In some cases, the one or more determined parameters are a subset of the rule parameters of the at least one relevant rule. In one embodiment, the AI processor 130 analyzes the intake request, including the plurality of intake terms, with the one or more rule parameters to determine whether the intake request has missing information and/or inconsistent information. In some cases, the AI processor 130 determines the one or more parameters associated with the missing information and/or inconsistent information.

In some embodiments, the natural language processor 120 is configured to compose one or more queries based on the one or more parameters, the at least one relevant rule, and the intake request using a natural language generation model. In some embodiments, the natural language processor 120 uses a natural language generation model to generate queries. As used herein, a natural language generation model refers to a process of producing meaningful phrases and sentences in the form of natural language. In some cases, the natural language generation model transforms structured data (e.g., parameters) into meaningful phrases and sentences. In some cases, the natural language generation model uses a predetermined language model (e.g., English, Chinese, etc.). In some cases, the natural language generation model uses a machine learning model such as, for example, Markov chain, recurrent neural network, long short-term memory (LSTM) model, and the like.

By way of a non-limiting example, the intake request is "a contract dispute for a supply contract between party X and party Y." One relevant rule is a statute of limitation for contract dispute rule of the applicable state(s). The one or more example rule parameters may include a date of the contract signed, location information of parties to the contract, and governing law (if specified). In this example, the AI processor 130 may identify the intake request missing information of a date of the contract signed, location information of parties to the contract, and governing law. With that, the natural language processor 120 may generate queries, such as, "what is the date the supply contract between party X and party Y was signed?", "what is the primary business location of party X?", "what is the governing law of the contract, if specified?"

In some embodiments, the optional education processor 140 is configured to retrieve, select or generate one or more pieces of educational information based on the at least one relevant rule. In some cases, the educational information is stored in the rule repository 170. In some cases, the educational information is retrieved from other system(s) 190. The historical case information may be stored in the case repository 175. The historical case information may include intake request, intake terms, relevant rule(s), parameter(s), query(s) educational information presented, and/or user profile corresponding to the case. In some cases, the education processor 140 is configured to use the data in the case repository 175 to facilitate the generation of educational information using a trained machine learning model. In one embodiment, historical educational information of similar cases may be retrieved and analyzed to facilitate the generation and/or selection of the one more pieces of educational information.

In some embodiments, a piece of educational information is associated with a difficulty level. In one embodiment, the difficulty level is predetermined. In some cases, the difficulty level can be adjusted. In one implementation, difficulty levels are represented by numbers, for example, difficulty levels of 0-5 with 0 being least difficult and 5 being most difficult. In some cases, at least some of the rules (e.g., stored in the rule repository 170) each is associated with two or more pieces of educational information. In some implementations, the two or more pieces of educational information are associated with different difficulty levels from each other. In some cases, the education processor 140 is configured to select a piece of educational information of the two or more pieces of educational information for a rule based on the intake request. The education processor 140 may select a piece of educational information of the two or more educational information for a rule based on the user profile, for example, based on the social economic information, the reading comprehension level, and/or the learning style of the user.

In some embodiments, at least some of the rules (e.g., stored in the rule repository 170) each is associated with three or more pieces of educational information. In some implementations, the three or more pieces of educational information are associated with different difficulty levels from one another. In some cases, the education processor 140 is configured to select a piece of educational information of the three or more pieces of educational information for a rule based on the intake request. The education processor 140 may select a piece of educational information of the three or more educational information for a rule based on the user profile, for example, based on the social economic information, the reading comprehension level, and/or the learning style of the use.

The input/output processor 110 is configured update the user portal by presenting the one or more queries in the interactive region; and/or presenting the one or more pieces of educational information in the information region. In embodiments, the dynamic portal system 100 and its components configured to interface with a user, for example, via the input/output processor 110. In some cases, the education processor 140 may change the educational information based on responses of the user to the queries, also referred to as query inputs. In some case, the intake request is incorporated with the query inputs, and further processed by the natural language processor 130 and/or the AI processor 140. In one example, the dynamic portal system 100 may change a first piece of educational information of a first difficulty level associated with a rule to a second piece of educational information of a second difficulty level associated with the rule, for example, in response to a query input received from the user and analysis indicating incomplete intake request. The first piece of educational information is different from the second piece of educational information. The first difficulty level is the same or different from the second difficulty level. In some cases, the first difficulty level is higher than the second difficulty level.

In some embodiments, the education processor 140 is configured to present different pieces of educational information for a rule sequentially. In some cases, if the number of the pieces of educational information is greater than a predetermined threshold, the dynamic portal system 100 is configured to provide contact information of one or more consultants to the user. In one embodiment, the contact information is presented in the information region. In embodiments, a verification code can be generated after the user has consulted with the one or more consultants and the system can continue the intake process after the verification code is entered.

In some cases, the education processor 140 can provide one or more links to additional details of a rule on the dynamic portal. In some cases, the education processor 140 can provide legal information based on the case information and identified case type, without providing any legal representation. In some embodiments, the education processor 140 is configured to provide a checklist and/or an outline of relevant required information associated with the rule and/or the intake request.

In one example related to a legal issue submission, the dynamic portal system 100 may look at the input(s) provided by the user to allow the system to determine if certain criteria related to a legal rule are met, which then allows the system to determine if and when legal rules become applicable. Once the system has determined that a legal rule is applicable, the system can provide the user with an explanation of what the triggered rule means and what requirements it has. In some cases, the system provides the user an outline of what a triggered rule requires. For example, if the user states that a child of a marriage is disabled, this fact may mean that the parent is entitled to alimony from the other parent. Next, the system may list required information such as, for example, a medical determination of disability, proof that the care giving parent is not able to work full-time due to the care requirements of the child, details about the child's needs, and/or the like. The education processor 140 and/or the dynamic portal system 100 may provide an explanation of the legal means to the user, its required elements, and what additional information is required. The education processor 140 and/or the dynamic portal system 100 may provide a statement that the court will make a determination of whether alimony is appropriate or not based on the facts presented at a hearing.

In some embodiments, the education processor 140 is configured to request feedbacks from users, such as, for example, whether the explanation is clear or whether further explanation is required. In some cases, the education processor 140 is configured to have multiple explanations for a specific rules. In some cases, these levels can include multiple explanations ranked from low to high, for example, based on reading comprehension levels. In some cases, these multiple explanations can include information presented in various formats such as, for example, visual or audio formats, which may be chosen by a user or automatically selected based on inputs indicating the user's learning style. As an example, when providing a text-based explanation of a type of parenting schedule such as a 2-2-3 configuration, the system may determine that the user may better understand the configuration if it is presented in an interactive calendar so that they can visually see the configuration based on the user's learning style. In one embodiment, as the user progresses through the process, the system is configured to track the learning style of the user or analyze inputs and/or feedbacks to determining the learning style of the user. In such embodiment, the system 100 and/or the education processor may select a presentation format adjusted to the user's learning style.

In some embodiments, the natural language processor 120 is configured to generate a textual document based on the intake request and query inputs, identified issue and relevant rules. For example, the text document is a legal document. In one example, the text document is a legal complaint. The interface engine 150 is configured to interface with other systems 190. In embodiments, the interface engine 150 is configured to connect to an electronic filing system via a software interface. In embodiments, the interface engine 150 is configured to use a set of predetermined protocol through the software interface. In embodiments, the software interface comprises at least one of an application programming interface and a web service interface.

Figure 3B:
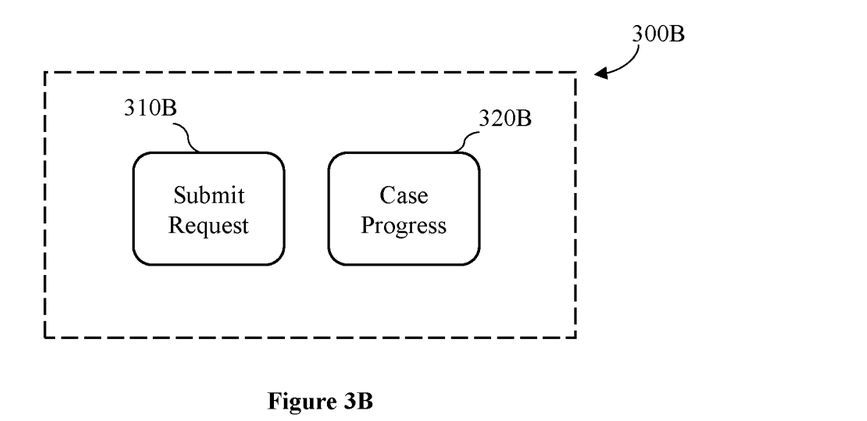
FIG. 3B is an illustrative examples of graphical user interface of a dynamic portal.

The optional alert engine 160 can generate a schedule based on the at least one relevant rules and the intake request. In one embodiment, the alert engine 160 can transmit the schedule to the user. In some cases, the alert engine 160 can generate one or more alerts based on the at least one relevant rules and the intake request, the one or more alerts associated with an alert timeline. In some cases, the alert engine 160 can transmit the one or more alerts to the user according to the alert timeline. In one example of a legal dynamic portal system, the alert engine 160 can track a timeline of a case and provide configurable reminders for the case, for example, a timeline for reply, a timeline for discovery, a timeline for conference, and/or the like. FIG. 3B is an illustrative graphical representation of a user interface to allow user access to both the request submission and the alert engine. In this example, a user click on 310B to enter into request submission and click on 320B to access alert engine and to monitor the progress of the case.

The rule repository 170 and the case repository 175 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components of the system 100 can execute software or firmware stored in non-transitory computer-readable medium to implement various processing steps. Various components and processors of the system 100 can be implemented by one or more computing devices, including but not limited to, circuits, a computer, a processor, a processing unit, a microprocessor, a mobile computing device, and/or a tablet computer. In some cases, various components of the system 100 (e.g., the natural language processor 120 and the AI processor 130) can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the dynamic portal system 100 can be implemented in software or firmware executed by a computing device.

Various components of the system 100 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2A:
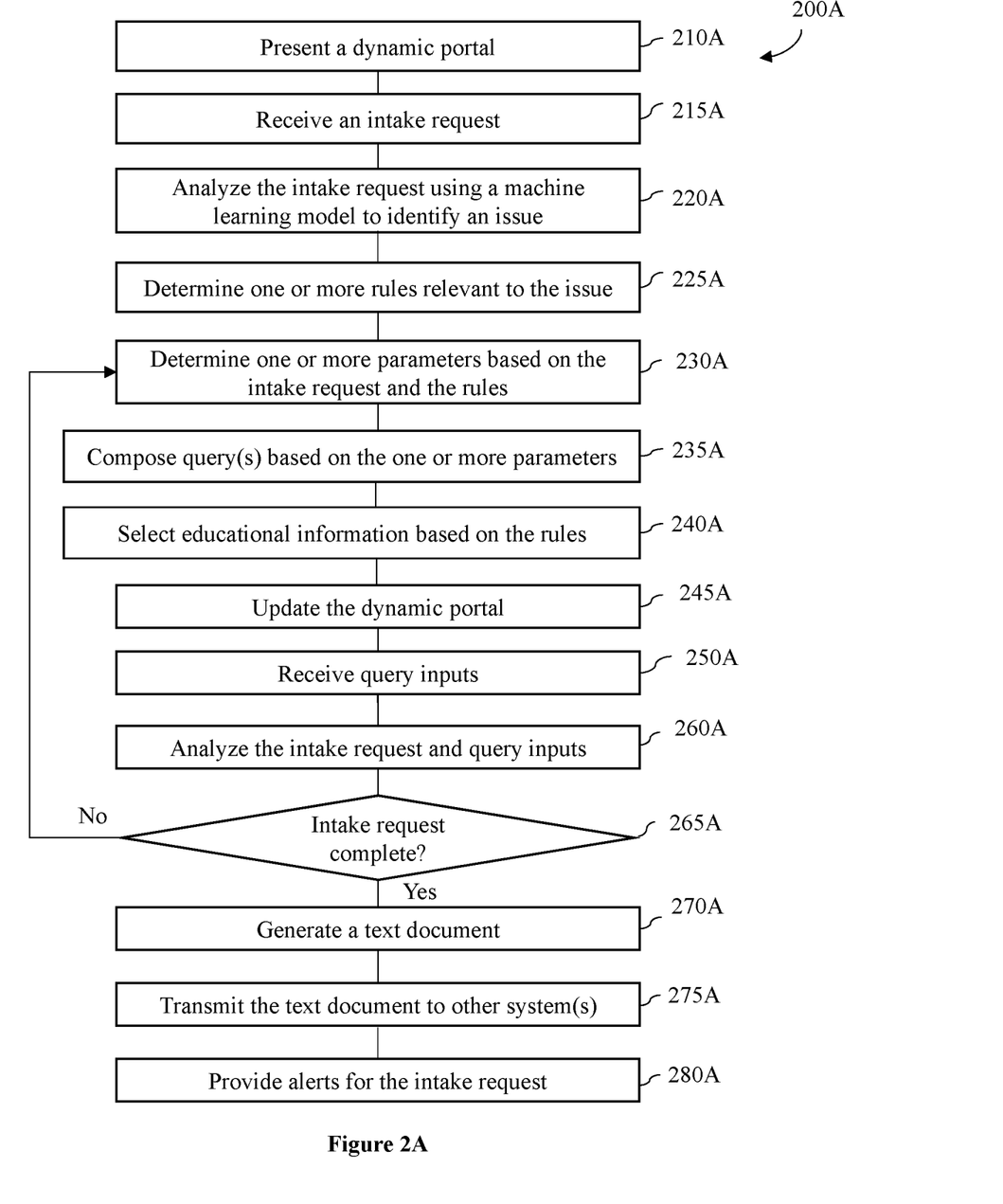
FIG. 2A depicts one illustrative flow diagram of a dynamic portal system.

FIG. 2A depicts one illustrative flow diagram 200A of a dynamic portal system (e.g., the dynamic portal system 100 of FIG. 1). Aspects of embodiments of the method 200A may be performed, for example, by components of a dynamic portal system (e.g., components of the dynamic portal system 100 of FIG. 1). One or more steps of method 200A are optional and/or can be modified by one or more steps of other embodiments described herein. Additionally, one or more steps of other embodiments described herein may be added to the method 200A. As illustrated, the dynamic portal system presents a dynamic portal (210A). In some cases, the dynamic portal includes an interactive region and an information region. FIG. 3A is an illustrative example of a graphical representation of a dynamic portal 300A. The dynamic portal 300A includes an interactive region 310A and an information region 320A.

The system is configured to receive an intake request (215A), in some cases, submitted by a user via the interactive region. In embodiments, the intake request is a text stream. In some cases, the intake request comprises a description of a request in one or more sentences. The system is configured to analyze the intake request using a machine learning model to identify an issue (220A). In some cases, an identified issue is a normalized intake request to match with a standardized issue (e.g., a contract dispute issue, an estate dispute issue, etc.). In some cases, the identified issue is a legal issue. As use herein, a machine learning model may refer to a machine learning model, a deep learning model, a natural language processor model, and/or a natural language generation model. In one embodiment, the system is configured to allow a selection and/or search of a category from categories of issues. FIG. 3A includes an interface item 312A for searching a category. In one example, the system presents a selectable menu in the interactive region, where the selectable menu includes a list of categories of issues. The category information can be used to facilitate identifying the issue. In embodiments, the system is configured to determine one or more rules relevant to the issue (225A). In embodiments, the system determines one or parameters associated with missing information and/or inconsistent information based on the intake requests and the identified rules (230A). More details on analyzing an intake request to identify an issue, determine relevant rule(s) and/or parameter(s) are described in the present disclosure herein (e.g., FIG. 2B).

In some embodiments, the system is configured to compose query(s) based on the one or more parameters (235A) indicative of missing information and/or inconsistent information. In one embodiment, the query is composed based on a query template, for example, a query template for a rule parameter. In one embodiment, the query(s) can be generated using a natural language generation model to generate queries. In some cases, the natural language generation model can transform (e.g., parameters) structured data into meaningful phrases and sentences. In some cases, the natural language generation model uses a predetermined language model (e.g., English, Chinese, etc.). In some cases, the natural language generation model uses a machine learning model such as, for example, Markov chain, recurrent neural network, long short-term memory (LSTM) model, and the like.

In some embodiments, the system is configured to select or generate educational information based on the identified relevant rules (240A). More details on selecting or generating educational information based on relevant rule(s) are described in the present disclosure herein (e.g., FIG. 2C). In embodiments, the portal system updates the dynamic portal (245A) by presenting the compiled queries and/or the composed educational information. The system is further configured to receive query inputs (250A), for example, directly from the dynamic portal.

In some embodiments, the system is configured to analyze the intake request incorporated with the query inputs (260A). In some cases, the system determines whether the intake request is completed (265A), for example, whether all information required for relevant rules for the intake request is provided considering the intake request and the query inputs. In one embodiment, if the intake request is not complete, the system goes back to determine parameters (230A) associated with missing information and/or inconsistent information. In one embodiment, if the intake request is complete, the system is further configured to compile a text document (270A) based on the intake request incorporated with the query inputs, the identified issued, and the relevant rules. In one example, the compiled text document is a legal document. In one example, the complied text document is a legal complaint.

Optionally, the system can transmit the text document to another system (275A), for example, an electronic filing system, a court system, or the like. In some cases, the system can transmit the text document to more than one systems. In one embodiment, the transmission is completed via a software interface. In some embodiments, the system is configured to store the case information in the case repository (e.g., case repository 175 of FIG. 1). In some designs, the case information includes, but not limited to, the intake request, normalized intake terms, identified issue, relevant rules, determined parameters associated with missing and/or inconsistent information, query(s), query input(s), educational information presented, and/or the generated text document.

Further, optionally, the system can provide alerts for the intake request (280A), for example, schedule alerts, actionable alerts, and/or the like. In some cases, the system is configured to use the relevant rules to generate the alerts. In some cases, the system is configured to interface other systems to generate the alerts. For example, the system is configured to receive docketing information from other system(s) and generate schedule alerts according to the docketing information.

Figure 2B:
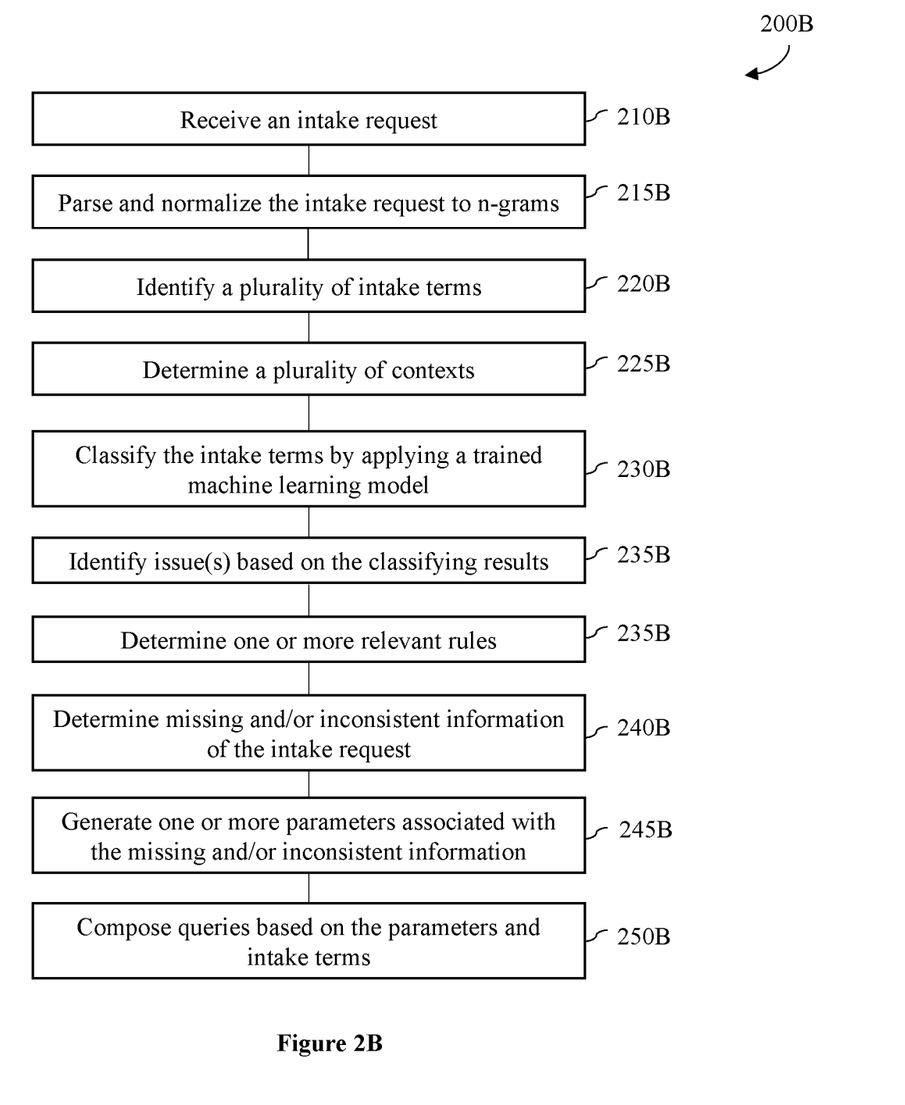
FIG. 2B depicts one illustrative flow diagram of a dynamic portal system for analyzing intake requests and determining missing and/or inconsistent information

FIG. 2B depicts one illustrative flow diagram 200B of a dynamic portal system (e.g., the dynamic portal system 100 of FIG. 1) for analyzing intake requests and determining missing and/or inconsistent information. Aspects of embodiments of the method 200B may be performed, for example, by components of a dynamic portal system (e.g., components of the dynamic portal system 100 of FIG. 1). One or more steps of method 200B are optional and/or can be modified by one or more steps of other embodiments described herein. Additionally, one or more steps of other embodiments described herein may be added to the method 200B. As illustrated, the system is configured to receive an intake request (210B). In embodiments, an intake request includes query inputs provided by a user. The system is further configured parse and normalize the intake request into n-rams (215B). Next, the system is configured identify a plurality of intake terms (220B), for example, based on the n-grams. The system is further configured to identify a plurality of contexts (225B) for the intake terms and the system may change the intake terms according to the context. For example, the context indicates a negation and an intake term (i.e., payment on time) is changed to a negated intake term (e.g., payment not on time). In some cases, the plurality of contexts include different parts of the same sentence of the intake terms.

In some embodiments, the dynamic portal system is configured to classify the intake terms by applying a trained machine learning model to the intake terms (230B). In one embodiment, the trained machine learning model includes one or more decision trees. In some cases, decision trees are integral in determining what information needs to be collected from the user and what rules are applicable to the user's case. The decision tree may allow the system to customize a workflow for the user's case and determine steps and subsequent steps. In one embodiment, each case type may have a respective base decision tree. Each of these base decision trees can have subset(s) of decision trees. In one embodiment, depending on the requests and information provided by the user and the applicable rule(s), the system may create customized workflow for the user and certain subsets of decision trees can be activated. In one example, if the parties in a marriage dispute having one or more children, a subset of the decision tree related to children can be activated in the workflow. Further to this example, the system may provide educational information triggered by the subset of the decision tree related to children.

The system is further configured to identify issue(s) based on the classifying results (235B). For example, an alimony support issue is identified. As another example, a breach of confidentiality issue is identified. The system may determine one or more relevant rules (235B) based on the identified issue(s). The system may determine missing and/or inconsistent information associated with the intake terms and the identified relevant rules (240B). In one embodiment, each relevant rule is associated with rule parameters such as, for example, time parameter(s), party parameter(s), a location parameter(s), law parameter(s), and/or the like. The missing and/or inconsistent information can be determined, for example, by comparing the intake terms with the rule parameters.

In embodiments, the system is configured to generate one or more parameters associated with the missing and/or inconsistent information (245B). In some cases, the one or more parameters associated with missing and/or inconsistent information are a subset of the rule parameters. For example, the system identifies a rule with five (or, ten, thirty, etc.) rule parameters and determines two of five rule parameters having missing and/or inconsistent information. The system can generate two parameters associated with the two of five rule parameters.

In embodiments, the system is configured to compose queries based on the generated parameters and intake terms (250B). The queries are to solicitate information relevant to the missing and/or inconsistent information. In one embodiment, each parameter of a relevant rule is associated with a query template. In another example, a query template is associated with a plurality of parameters. In the cases of having query templates, the queries are composed based on the generated parameters, intake request (including intake terms and query inputs), and/or the templates. In some cases, the system may generate query(s) in free-form utilizing the intake terms and the parameters.

Figure 2C:
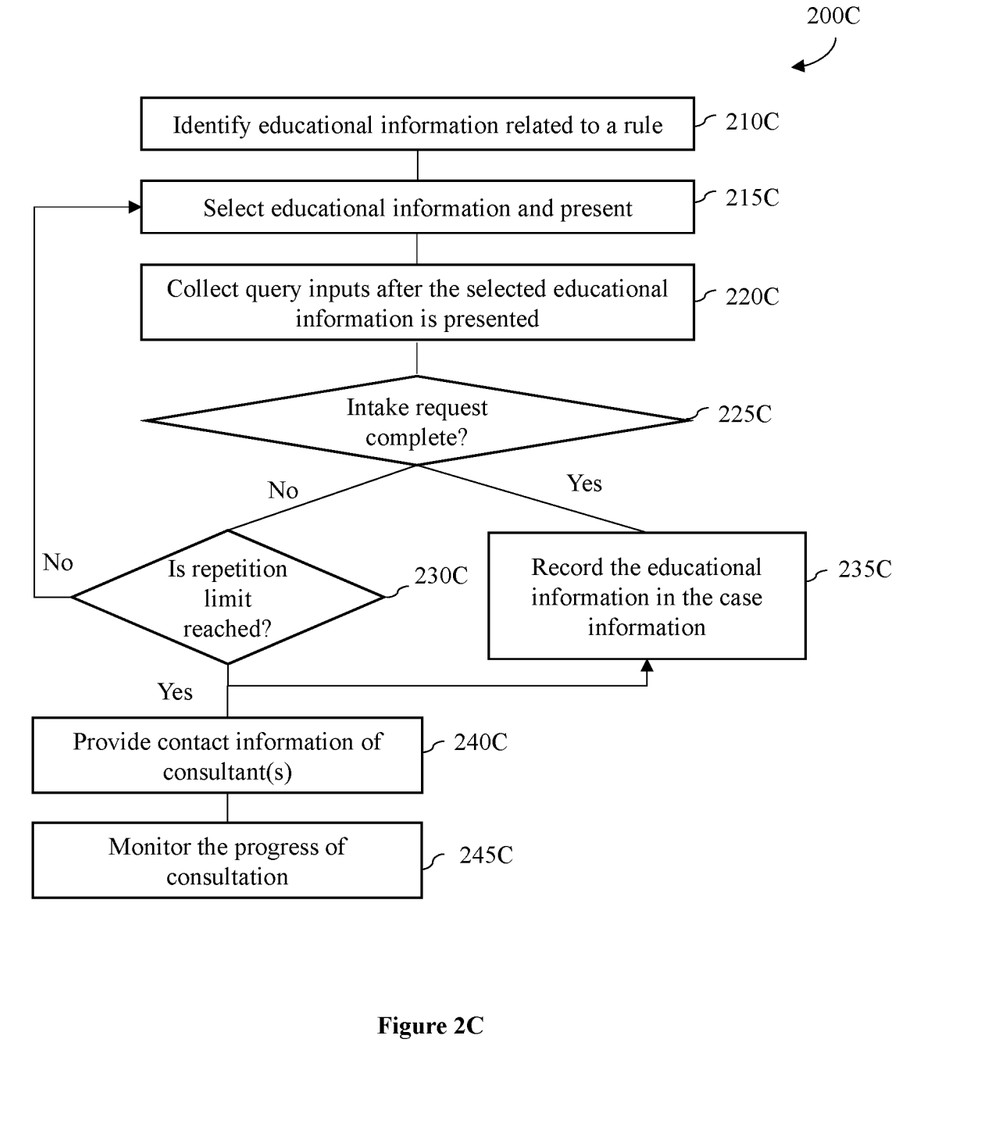
FIG. 2C depicts one illustrative flow diagram of a dynamic portal system for selecting educational information.

FIG. 2C depicts one illustrative flow diagram 200C of a dynamic portal system (e.g., the dynamic portal system 100 of FIG. 1) for selecting educational information. Aspects of embodiments of the method 200C may be performed, for example, by components of a dynamic portal system (e.g., components of the dynamic portal system 100 of FIG. 1). One or more steps of method 200C are optional and/or can be modified by one or more steps of other embodiments described herein. Additionally, one or more steps of other embodiments described herein may be added to the method 200C. The system is configured to identify educational information related to a rule (210C). In some cases, the educational information is stored in a rule repository (e.g., the rule repository 170 in FIG. 1). In some cases, the educational information is retrieved from another system (e.g., systems 190 in FIG. 1). Next, the system is configured to select educational information and present it to the user (215C).

The system may select one or more pieces of educational information based on the associated difficulty levels. In one embodiment, the system may select the one or more pieces of educational information based on a default difficulty level. In another embodiment, the system may select the one or more pieces of educational information with a difficulty level based on a user profile of the user. In yet another embodiment, the system may select the one or more pieces of educational information with a difficulty level at least partially based on the user's historical case information, historical case information of other users, or any combinations thereof. In yet another embodiment, the system may select the one or more pieces of educational information based on educational information that have been presented before for this intake request. For example, if three pieces of educational information are associated with the rule and one piece of educational information is presented before, the system may select a different piece of educational information out of the three pieces of educational information.

In embodiments, the system is configured to collect query inputs after the selected educational information is presented (220C). The query inputs refer to inputs and responses received in response to queries. The system is further configured to analyze intake request incorporated with query inputs to determine whether the intake request is completed (225C). In one embodiment, the system is configured to use rule parameters to generate an analysis result, where the analysis result indicates whether the intake request has missing and/or inconsistent information.

If the intake request is complete, the system may record the educational information in the case information (235C), and store in the case repository. The system may continue to perform other actions, for example, step 270A and/or other steps in FIG. 2A. If the intake request is not complete, the system may evaluate whether the repetition limit is reached (230C). A repetition refers to one piece of educational information and/or a set of queries being presented for a rule. In some cases, a repetition limit is a predetermined threshold. If the repetition limit is reached, the system may provide contract information of consultant(s) (240C) to user, for example, on the dynamic portal. For example, the repetition limit is three, such that after three pieces of educational information for the rule have been presented, the system will move to step 240C. If the repetition limit is not reached, the system will repeat step 215C to select educational information and present it.

If the repetition limit is reached, the system may also record the educational information in the case information (235C). Additionally, the system may monitor the progress of consultation (245C). In one example, the system may receive a confirmation code from the consultant, where the confirmation code indicates a completion of a consultant section. In some cases, a user can enter query inputs with the verification code. In some embodiments, the trained machine learning model is trained by historical case information collected over time.

Various modifications and alterations of this invention will be apparent to those skilled in the art without departing from the spirit and scope of this invention. The inventions described herein are not limited to the illustrative examples set forth herein. For example, the reader should assume that features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method implemented on a computer system having one or more processors and memories, comprising:
   presenting a user portal comprising an interactive region and an informational region;
   receiving an intake request submitted by a user via the interactive region, the intake request being a text stream;
   analyzing the intake request to identify an issue associated with the intake request,
   wherein analyzing the intake request to identify an issue associated with the intake request comprises:
      parsing the intake request using a natural language model into a plurality of intake terms;
      determining a plurality of contexts of the plurality of intake terms using the natural language model;
      classifying the plurality of intake terms by applying a trained machine learning model to the plurality of intake terms and the plurality of contexts to generate at least one classifying result; and identifying the issue based on the classifying result;

determining at least one rule of a plurality of rules relevant to the issue associated with the intake request;

determining one or more parameters based on the intake request and the at least one relevant rule, the one or more parameters associated with at least one of missing information and inconsistent information;

composing one or more queries based on the one or more parameters, the at least one relevant rule, and the intake request;

selecting one or more pieces of educational information from a rule repository based on the at least one relevant rule;

updating the user portal by:
presenting the one or more queries in the interactive region; and
presenting the one or more pieces of educational information in the informational region; and determining one or more rule parameters for each of the plurality of rules;

wherein the one or more rule parameters comprise at least one rule parameter selected from the group consisting of a timing parameter, a party parameter, a location parameter, and a quantitative parameter.

2. The method of claim 1, wherein using the natural language model comprises:
parsing the intake request into n-grams; and
generating the plurality of intake terms based on the n-grams.

3. The method of claim 1, wherein the plurality of contexts are extracted from the intake request.

4. The method of claim 1, wherein at least a part of the plurality of contexts are exacted from a user profile of the user.

5. The method of claim 1, wherein the user profile comprises at least one of age information, gender information, a reading comprehension level, a learning style, and social economic information.

6. The method of claim 1, wherein the intake request comprises a description of a request in one or more sentences.

7. The method of claim 1, further comprising:
presenting a selectable menu in the interactive region, wherein the selectable menu comprises a list of categories of issues; and
receiving a selection by the user.

8. The method of claim 1, wherein the trained machine learning model is trained by historical case information collected over time, wherein each historical case information comprises an intake request, an identified issue, one or more intake terms, one or more relevant rules, one or more parameters, one or more queriers, one or more pieces of educational information, or any combination thereof.

9. The method of claim 1, further comprising:
interfacing with an electronic filing system via a software interface.

10. The method of claim 9, wherein the software interface comprises at least one of an application programming interface and a web service interface.

11. The method of claim 1, wherein determining one or more parameters comprises:
retrieving the one or more rule parameters of the at least one relevant rules;
analyzing the plurality of intake terms by normalizing the plurality of intake terms and comparing the one or more rule parameters with the plurality of intake terms to generate a first analysis result;
determining the at least one of missing information and inconsistent information based on the first analysis result; and
determining the one or more parameters associated with the at least one of missing information and inconsistent information.

12. The method of claim 11, wherein composing one or more queries comprises:
selecting one or more templates based on the at least one relevant rule; and
composing the one or more queries based on the one or more parameters and the one or more templates.

13. The method of claim 11, further comprising:
receiving a query input in response to the one or more queries from the user; and
analyzing the intake request using the one or more rule parameters to generate a second analysis result, the second analysis result indicating whether the intake request is complete, the intake request comprising the query input.

14. The method of claim 13, further comprising:
in response to the intake request being not complete;
composing a text document based on at least one of the intake request, the query input, and the at least one relevant rule using a natural language generation model.

15. The method of claim 14, further comprising:
submitting the text document to an electronic filing system via a software interface.

16. The method of claim 13, further comprising:
in response to intake request being complete, providing a contact information of a consultant related to the identified issue.

17. The method of claim 16, further comprising:
receiving a confirmation code from the consultant, the confirmation code indicating a completion of a consultant section;
presenting the one or more queries in the interactive region;
receiving a second query input from the user; and
composing a text document based on at least one of the intake request, the second query input, and the at least one relevant rule using the natural language generation model.

18. The method of claim 17, further comprising:
submitting the text document to an electronic filing system via a software interface.

19. The method of claim 1, further comprising:
generating a schedule based on the at least one relevant rule and the intake request.

20. The method of claim 19, further comprising:
transmitting the schedule to the user.

21. A method implemented on a computer system having one or more processors and memories, comprising:
presenting a user portal comprising an interactive region and an informational region;
receiving an intake request submitted by a user via the interactive region, the intake request being a text stream;
analyzing the intake request to identify an issue associated with the intake request,
wherein analyzing the intake request to identify an issue associated with the intake request comprises:
parsing the intake request using a natural language model into a plurality of intake terms;

determining a plurality of contexts of the plurality of intake terms using the natural language model;

classifying the plurality of intake terms by applying a trained machine learning model to the plurality of intake terms and the plurality of contexts to generate at least one classifying result; and identifying the issue based on the classifying result;

determining at least one rule of a plurality of rules relevant to the issue associated with the intake request;

determining one or more parameters based on the intake request and the at least one relevant rule, the one or more parameters associated with at least one of missing information and inconsistent information;

composing one or more queries based on the one or more parameters, the at least one relevant rule, and the intake request;

selecting one or more pieces of educational information from a rule repository based on the at least one relevant rule;

updating the user portal by:
  presenting the one or more queries in the interactive region; and
  presenting the one or more pieces of educational information in the informational region; and generating one or more alerts based on the at least one relevant rule and the intake request, the one or more alerts associated with an alert timeline.

22. The method of claim 21, further comprising:
transmitting the one or more alerts to the user according to the alert timeline.

23. A method implemented on a computer system having one or more processors and memories, comprising:
  presenting a user portal comprising an interactive region and an informational region;
  receiving an intake request submitted by a user via the interactive region, the intake request being a text stream;
  analyzing the intake request to identify an issue associated with the intake request,
  wherein analyzing the intake request to identify an issue associated with the intake request comprises:
    parsing the intake request using a natural language model into a plurality of intake terms;
    determining a plurality of contexts of the plurality of intake terms using the natural language model;
    classifying the plurality of intake terms by applying a trained machine learning model to the plurality of intake terms and the plurality of contexts to generate at least one classifying result; and
    identifying the issue based on the classifying result;

determining at least one rule of a plurality of rules relevant to the issue associated with the intake request;

determining one or more parameters based on the intake request and the at least one relevant rule, the one or more parameters associated with at least one of missing information and inconsistent information;

composing one or more queries based on the one or more parameters, the at least one relevant rule, and the intake request;

selecting one or more pieces of educational information from a rule repository based on the at least one relevant rule;

updating the user portal by:
  presenting the one or more queries in the interactive region; and
  presenting the one or more pieces of educational information in the informational region;

wherein selecting one or more pieces of educational information comprises:
  receiving a plurality of pieces of educational information of the at least one relevant rule, each of the plurality of pieces of educational information associated with a difficulty level; and
  selecting a first piece of educational information from the plurality of pieces of educational information.

24. The method of claim 23, wherein the first piece of educational information is selected based on a user profile.

25. The method of claim 23, wherein the first piece of educational information is selected using the trained machine learning model based on historical case information.

26. The method of claim 23, further comprising:
receiving a query input from the user;
determining whether the intake request is complete, the intake request comprising the query input;
in response to the intake request being not complete,
  selecting a second piece of educational information from the plurality of pieces of educational information, the second piece of educational information different from the first piece of educational information.

27. The method of claim 26, wherein the first piece of educational information is associated with a first difficulty level, wherein the second piece of educational information is associated with a second difficulty level, and wherein the second difficulty level is different from the first difficulty level.

28. The method of claim 25, wherein the second difficulty level is a level indicative of less difficult than the first difficulty level.

* * * * *